(12) United States Patent
Lim

(10) Patent No.: US 9,379,366 B2
(45) Date of Patent: Jun. 28, 2016

(54) BATTERY MODULE

(71) Applicants: Samsung SDI Co., Ltd., Yongin-si, Gyeonggi-do (KR); Robert Bosch GmbH, Stuttgart (DE)

(72) Inventor: Young-Bin Lim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/153,946

(22) Filed: Jan. 13, 2014

(65) Prior Publication Data

US 2014/0212731 A1 Jul. 31, 2014

(30) Foreign Application Priority Data

Jan. 31, 2013 (KR) .......................... 10-2013-0011084

(51) Int. Cl.
*H01M 2/10* (2006.01)
(52) U.S. Cl.
CPC .................................. *H01M 2/1077* (2013.01)
(58) Field of Classification Search
CPC ................................................... H01M 2/1077
See application file for complete search history.

(56) References Cited

U.S. PATENT DOCUMENTS

| 2009/0042099 | A1 | 2/2009 | Tatematsu et al. |
| 2010/0190048 | A1 | 7/2010 | Yang et al. |
| 2011/0117401 | A1* | 5/2011 | Lee et al. ........................ 429/82 |
| 2011/0212355 | A1* | 9/2011 | Essinger et al. ............... 429/120 |
| 2011/0274958 | A1* | 11/2011 | Iritani et al. ................... 429/120 |
| 2011/0293998 | A1* | 12/2011 | Sato et al. ...................... 429/159 |
| 2012/0282515 | A1* | 11/2012 | Kim .................... H01M 2/1077 429/159 |
| 2013/0022859 | A1 | 1/2013 | Lim |
| 2013/0183571 | A1 | 7/2013 | Miyazaki et al. |

FOREIGN PATENT DOCUMENTS

| JP | 2006318703 A | * 11/2006 |
| KR | 10-2007-0057371 | 6/2007 |
| KR | 10-2008-0034220 A | 4/2008 |
| KR | 10-2008-0042285 A | 5/2008 |
| KR | 10-2013-0011740 | 1/2013 |
| WO | WO 2012/043594 A1 | 4/2012 |

OTHER PUBLICATIONS

Tox®Pressotechnik, Product Brochure, Sep. 2009, http://pdf.directindustry.com/pdf/tox-pressotechnik/tox-product-range/7212-172637.html, 16 pages.

(Continued)

*Primary Examiner* — Gregg Cantelmo
(74) *Attorney, Agent, or Firm* — Lewis Roca Rothgerber Christie LLP

(57) ABSTRACT

A battery module includes a plurality of battery cells arranged in a first direction; first and second end plates, the first and second end plates being located along the first direction at opposite ends of the plurality of battery cells; and at least one support plate coupling the first and second end plates to each other, the first end plate including at least one first fastening portion, the second end plate including at least one second fastening portion, and the support plate including a third fastening portion and a fourth fastening portion, the first and second fastening portions being coupled at an inner surface of the third and fourth fastening portions, respectively.

12 Claims, 5 Drawing Sheets

(56) References Cited

OTHER PUBLICATIONS

Bollhoff Group, Product Brochure, *Devices and systems for joining sheets and profiles without fasteners*, Feb. 2009, http://pdf.directindustry.com/pdf/bollhoff/rivelinch-r-devices-systems-joining-sheets-profiles-without-fasteners/9129-29986.html, 28 pages.

KIPO Office action dated Apr. 21, 2016, for Korean priority Patent application 10-2013-0011084, (9 pages).

* cited by examiner

BATTERY MODULE

CROSS-REFERENCE TO RELATED APPLICATION

This application claims priority to and the benefit of Korean Patent Application No. 10-2013-0011084, filed on Jan. 31, 2013, in the Korean intellectual Property Office, the entire content of which is incorporated herein by reference.

BACKGROUND

1. Field

The present invention relates to a battery module.

2. Description of the Related Art

A high-power battery module using a non-aqueous electrolyte with high energy density has recently been developed. The high-power battery module is configured as a large-capacity battery module manufactured by connecting a plurality of battery cells in series and is configured to be used for driving devices, e.g., motors of electric vehicles and the like, which require high power.

A battery pack is manufactured by accommodating a plurality of battery modules, together with a protective element, in a housing. The battery pack is often used as a power source of a large-sized electronic device, such as an electric vehicle or e-bike. The economical efficiency and safety of the battery pack are important. Accordingly, studies have been conducted in various fields so as to improve the economical efficiency and safety of the battery pack.

SUMMARY

Embodiments of the present invention provide a battery module in which a plurality of battery cells are fixed (e.g., firmly fixed) using a new member.

Embodiments of the present invention also provide a battery module capable of improving productivity by simplifying manufacturing processes and reducing manufacturing costs.

According to an aspect of the present invention battery module includes a plurality of battery cells arranged along a first direction; first and second end plates, the first and second end plates being located along the first direction at opposite ends of the plurality of battery cells; and at least one support plate coupling the first and second end plates to each other, the first end plate including at least one first fastening portion, the second end plate including at least one second fastening portion, and the support plate including a third fastening portion and a fourth fastening portion, the first and second fastening portions being coupled at an inner surface of the third and fourth fastening portions, respectively.

The first end plate may further include a first base portion, and the second end plate may further include a second base portion, the first and second base portions being adjacent to opposite ends of the plurality of battery cells, and the first and second fastening portion may extend from edges of and may be substantially perpendicular to the first and second base portions, respectively.

The support plate may further include a pair of first plates adjacent to opposite side surfaces of the plurality of battery cells, and a second plate adjacent to a bottom surface of the plurality of battery cells.

The pair of first plates may be integrally formed at and extend substantially perpendicularly from the second plate.

The first and second end plates and the support plate may be coated with an insulator.

The insulator may include a heat-dried coating.

The insulator may include a polyamide-imide resin or polyester-melamine resin.

The support plate may further include a main support portion adjacent to a side surface of the plurality of battery cells and located between the first and second end plates, and third and fourth fastening portions may extend along the first direction at opposite ends of the main support portion, respectively.

Each of the first and second fastening portions may further include prominences protruding inward, and each of the third and fourth fastening portions may further include a concave portion recessed inward and corresponding to the prominences.

A thickness of prominence may be less than a thickness of an area surrounding the prominence.

A height of the prominence may be in a range of about 1 mm to about 3 mm.

A cross-section in a plane parallel to the first fastening portion of the prominence may have a circular or polygonal shape.

The cross-section of the prominence may have a circular shape having an outside diameter in a range of about 3 mm to about 12 mm.

The prominences may have a through-hole therein, and the through-hole may extend through the first and third fastening portions and/or the second and fourth fastening portions.

The first and third fastening portions and the second and fourth fastening portions may each be coupled through a clinching process.

As described above, according to embodiments of the present invention, it is possible to provide a battery module in which a plurality of battery cells are fixed (e.g., firmly fixed) to each other using a new member.

Further, it is possible to provide a battery module capable of improving productivity by simplifying manufacturing processes and reducing manufacturing costs.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
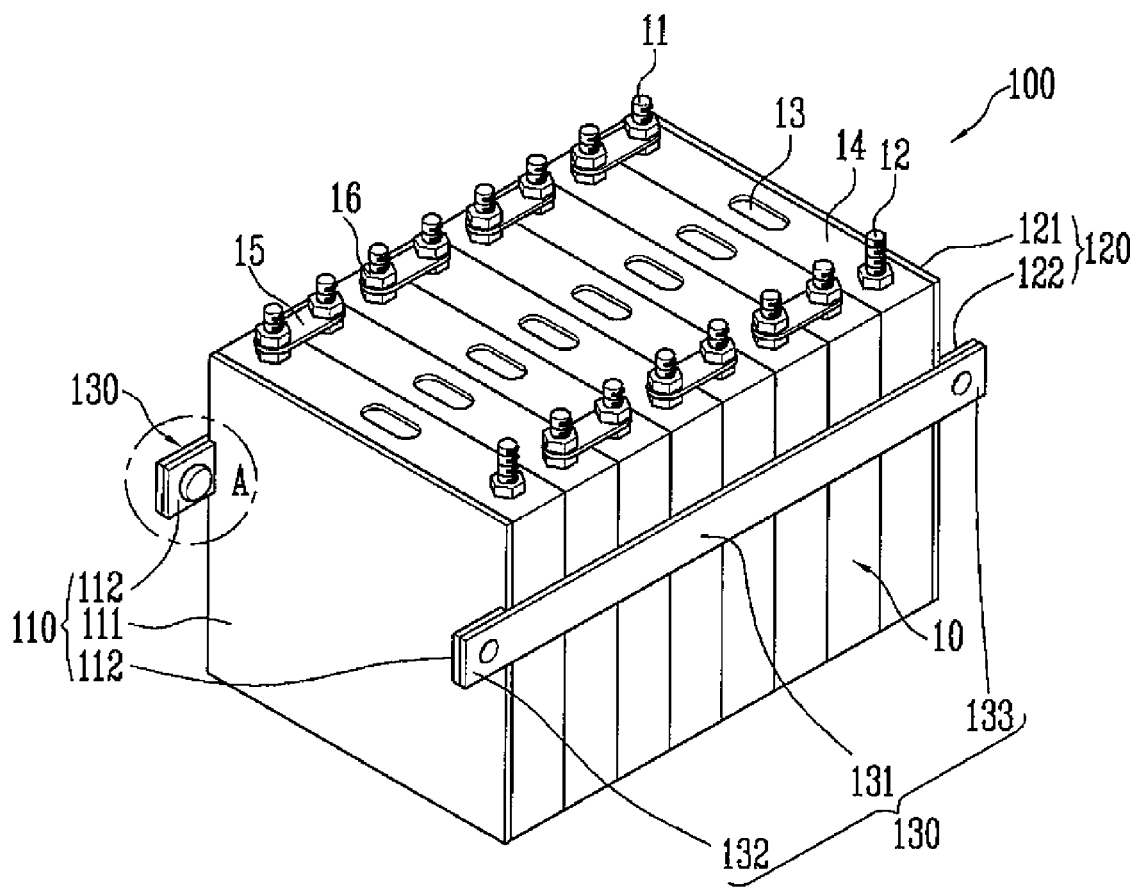
FIG. 1 is a perspective view of a battery module according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "coupled to" or "connected to" another element, it can be directly coupled to or connected to the another element or be indirectly coupled to or connected to the another element with one or more intervening elements interposed therebetween. Hereinafter, like reference numerals refer to like elements.

Figure 2:
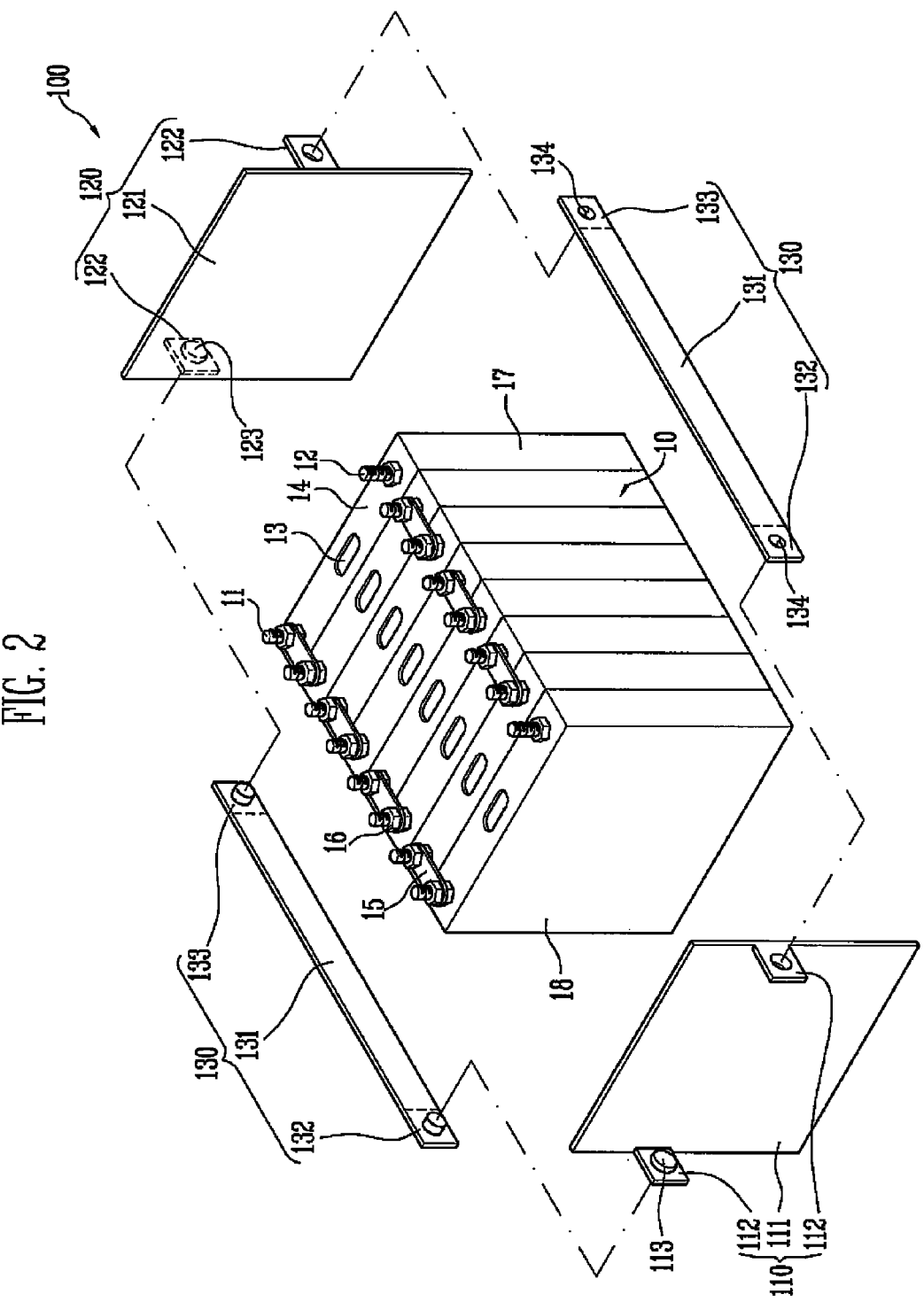
FIG. 2 is an exploded perspective view of the battery module of FIG. 1.

FIG. 1 is a perspective view of a battery module according to an embodiment of the present invention. FIG. 2 is an exploded perspective view of the battery module of FIG. 1.

The battery module 100 according to one embodiment includes a plurality of battery cells 10 aligned (e.g., arranged) in a first direction; first and second end plates 110 and 120 provided (e.g., located) opposite to (e.g., facing) each other at respective ends of the plurality of battery cells 10 (e.g., outside of the battery cells 10); and one or more support plates 130 coupling (e.g., connecting) the first and second end plates 110 and 120 to each other. In this case, first and second fastening portions 112 and 122 are provided at (e.g., located on) the first and second end plates 110 and 120, respectively. Third and fourth fastening portions 132 and 133 are adjacent to (e.g., overlap) the first and second fastening portions 112 and 122, respectively, and are provided (e.g., located) at opposite edges (e.g., opposite ends) of the support plate 130, respectively. The first and second fastening portions 112 and 122 are coupled to (e.g., fastened to) the third and fourth fastening portions 132 and 133, respectively. The first and second fastening portions 112 and 122 may each be coupled at (e.g., fastened at) an inner surface (e.g., a surface facing the battery cells 10) of the third and fourth fastening portions 132 and 133, respectively.

Each battery cell 10 may include a battery case having one opened surface, an electrode assembly, and an electrolyte. The electrode assembly and the electrolyte are accommodated in the battery case and generate energy through an electrochemical reaction therebetween. Each battery case is sealed by a cap assembly 14. The cap assembly 14 may include (e.g., be provided with) positive and negative electrode terminals 11 and 12 and a vent 13. However, the polarities of the terminals 11 and 12 are not limited thereto. The vent 13 is a safety device of the battery cell 10 and may act as a passage through which gas (e.g., excess gas) generated inside the battery cell 10 is exhausted to the outside of the battery cell 10. The positive and negative electrode terminals 11 and 12 of adjacent battery cells 10 in the battery module 100 may be electrically coupled to (e.g., electrically connected to) each other using (e.g., through) a bus-bar 15. The bus-bar 15 may be coupled (e.g., fixed or attached) to the positive and negative electrode terminals 11 and 12 by a nut 16 or the like.

The battery module 100 is formed (e.g., manufactured) by coupling (e.g., connecting or attaching) a plurality of battery cells 10 together with (e.g., by or through) the first and second end plates 110 and 120 and at least one support plate 130. The battery cells 10 are aligned (e.g., arranged) along the first direction, in which the wide (e.g., larger) surfaces 18 of the battery cells 10 are adjacent (e.g., opposite) to each other. The first and second end plates 110 and 120 are located at the respective outermost portions (e.g., ends) of the battery module 100 (e.g., ends of the plurality of battery cells 10) and face each other (e.g., are on a parallel plane along the first direction). Thus, the first and second end plates 110 and 120 apply a pressure to the battery cells 10 toward the inside of the battery cells 10. The support plate 130 is adjacent to (e.g., supports) a side 17 (e.g., a smaller side) of the battery cells 10 and couples (e.g., connects) the first and second end plates 110 and 120 to each other. The first fastening portion 112 of the first end plate 110 is coupled to (e.g., fastened to) the third fastening portion 132 of the support plate 130, and the second fastening portion 122 of the second end plate 120 is coupled to (e.g., fastened to) the fourth fastening portion 133 of the support plate 130. In this case, the first and second fastening portions 112 and 122 may be coupled at (e.g., fastened at) the inner surface (e.g., the surface facing the battery cells 10) of the third and fourth fastening portions 132 and 133, respectively.

Generally, a battery module includes a plurality of battery cells electrically coupled (e.g., electrically connected) together. In this case, a material, such as lithium, having high reactivity is contained inside the battery cell, and therefore, there is a concern regarding the safety of the battery module. In addition, the weight and volume of the battery module as a power source for an electric vehicle, transmission mechanism, or the like are desired to be low (e.g., minimized) according to a recent trend. Therefore, it is preferred that the battery module be formed or designed (e.g., manufactured) to have a low (e.g., minimum) volume while allowing the battery cells to be fixed (e.g., stably fixed to each other) so that the individual battery cells do not move with respect to each other. The battery cells may be fixed to form the battery module by (e.g., using a method of) coupling (e.g., connecting) a plurality of fixing members to one another, and a bolt-nut, rivet, or the like may be used to couple (e.g., in the method of connecting) the fixing members to one another.

The bolt-nut, rivet, or the like increases the volume of the battery module. In a case where a plurality of battery modules are aligned, the empty space (e.g., dead or unused space) between the battery modules is increased by at least the head portion of the bolt-nut or rivet. Also, a fastening process using the bolt-nut or rivet has a high failure rate, and therefore, it is difficult to perform (e.g., reliably perform) mass production. Further, because the unit cost of the bolt-nut or rivet is high, the production cost of the battery modules is increased. In order to address these concerns, an attempt to weld the fixing members has been made. However, it is difficult to connect the fixing members of the battery module by welding due to the presence of a coating for insulating the fixing members. In addition, there is a concern regarding the integrity (e.g., stability) of the battery cells due to sparks created during welding.

Accordingly, in the battery module according to embodiments of the present invention, the plurality of battery cells are fixed (e.g., firmly fixed to each other) by a new member. Because the bolt-nut or rivet is not used, it is possible to reduce production costs of the battery module and to decrease a failure rate through the simplification of processes, thereby improving processing efficiency.

In the battery module 100 according to an embodiment of the present invention, the first and second end plates 110 and 120 include first and second base portions 111 and 121, respectively. The first and second end plates 110 and 120 are adjacent to respective ends of the plurality of battery cells 10 and are arranged along the first direction. The first and second fastening portions 112 and 122 may extend in a direction perpendicular to the first and second base portions 111 and 121, respectively (e.g., may extend along the first direction).

The support plate 130 may include a main support portion 131 adjacent to (e.g., contacting or supporting) the side surfaces 17 (e.g., the smaller sides) of the battery cells 10 and located between the first and second end plates 110 and 120. The third and fourth fastening portions 132 and 133 may extend parallel with each other at opposite ends of the support plate 130 and be adjacent to (e.g., overlap) the first and second fastening portions 112 and 122, respectively. For example, the first and second fastening portions 112 and 122 may be sized to correspond to the third and fourth fastening portions 132 and 133, respectively.

Figure 3A:
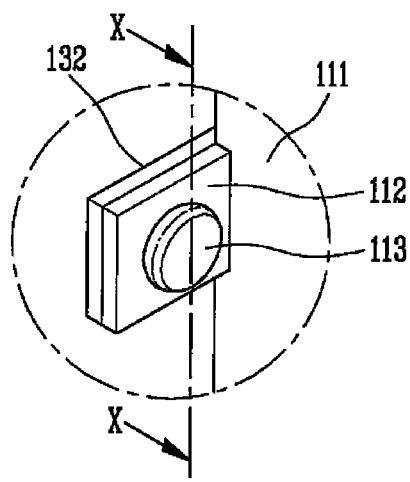
FIG. 3A is an enlarged view of portion A of FIG. 1.
Figure 3B:
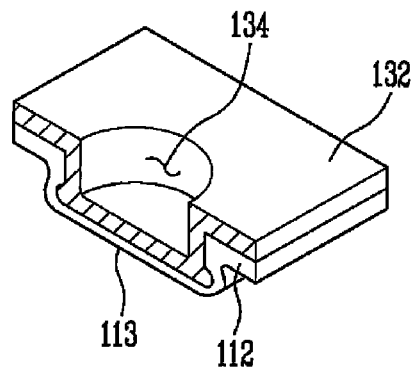
FIG. 3B is a perspective view taken along the line X-X of FIG. 3A.
Figure 3C:
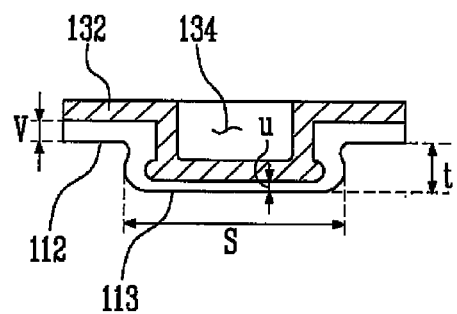
FIG. 3C is a sectional view taken along the line X-X of FIG. 3A.

FIG. 3A is an enlarged view of portion A of FIG. 1. FIG. 3B is a perspective view taken along the line X-X of FIG. 3A. FIG. 3C is a sectional view taken along the line X-X of FIG. 3A.

Referring to FIGS. 3A to 3C, the first and second fastening portions 112 and 122 may each include prominences (e.g., protrusions) 113 and 123 protruding inward and. The third and fourth fastening portions 132 and 133 may each include a concave portion 134 recessed inward (e.g., toward the battery cells 10). Therefore, the main support portion 131 of the support plate 130 forms an outermost portion of the battery module 100. When a plurality of battery modules are aligned, the battery modules may be located adjacent to (e.g., contact) each other so that no dead space exists between the battery modules, thereby increasing (e.g., maximizing) space efficiency.

The fastening members may be coupled together (e.g. fastened together) using, for example, a clinching process. The clinching process includes (e.g., is a process of) coupling (e.g., fastening) two or more separate members using (e.g., with) pressure or force (e.g., mechanical pressure or force). The clinching process may be performed using (e.g., by) a die and a punch. The die has a concave portion corresponding to the punch and supports (e.g., transfers) the pressure exerted by (e.g., caused by) the punch. The separate members are coupled by placing (e.g., interposing) the separate members between the die and punch and then pressurizing (e.g., applying a pressure or force to) the members using (e.g., with) the punch. In this case, an area (e.g., a portion) contacting the punch is recessed (e.g., recessed inward), and an area (e.g., a portion) contacting the die is protruded corresponding to the concave portion of the die, thereby coupling (e.g., fastening) the separate members to each other.

The first end plate 110 includes the first fastening portions 112 at opposite edges (e.g., both sides) of the first base portion 111. The third fastening portion 132 of the support plate 130 is adjacent to (e.g., overlaps or corresponds with) the first fastening portion 112 at an outer surface (e.g., outside) of the first fastening portion 112. In this case, the first and third fastening portions 112 and 132 may be coupled (e.g., fastened) to each other using, for instance, the clinching process. The third fastening portion 132 may have the concave portion 134, and the first fastening portion 112 may have the prominence 113 (e.g., the protrusion). The second fastening portion 122 of the second end plate 120 may also be coupled (e.g., fastened) to the fourth fastening portion 133 of the support plate 130 in a similar manner. In this case, the prominences 113 of the first fastening portions 112 extend in (e.g., protrude in) opposite directions (e.g., extend towards each other). Hereinafter, detailed descriptions of the second and fourth fastening portions 122 and 133 will be omitted.

A thickness u of the prominence 113 formed in (e.g., provided to) the first fastening portion 112 may be thinner (e.g., less) than a thickness V of a peripheral portion of the prominence 113 (e.g., a non-extruded portion of the first fastening portion 112). The height t (e.g., prominent height) of the prominence 113 may be in a range of about 1 mm to about 3 mm. In a case where the height t of the prominence 113 exceeds about 3 mm, the thickness of the prominence 113 is decreased (e.g., excessively decreased), and therefore, the first and third fastening portions 112 and 132 may be fractured or damaged. In a case where the height t of the prominence 113 is less than about 1 mm, the coupling area (e.g., fastening power) between the first and third fastening portions 112 and 132 is decreased, and therefore, the battery cells cannot be fixed (e.g., firmly fixed).

A cross-section of the prominence 113, taken in a plane parallel to the first fastening portion 112, may have a circular or polygonal shape. For example, the cross-section of the prominence 113 may have a circular shape having an outside diameter S in a range of about 3 mm to about 12 mm. In a case where the outside diameter S of the prominence 113 is less than about 3 mm, the coupling area (or coupling force) between the first and third fastening portions 112 and 132 is small. In a case where the coupling area of the prominence 113 is small, the coupling force (e.g., fastening power) between the first and third fastening portions 112 and 132 is decreased. In a case where the outside diameter S of the prominence 113 exceeds about 12 mm and because the first and third fastening portions 112 and 132 are formed (e.g., necessarily provided) to have a surface area that is at least wider than the outside diameter S of the prominence 113, the design of the first and third fastening portions 112 and 132 would be limited. In addition, excessively large pressure or force may be more easily applied to the first and third fastening portions 112 and 132 in such a case, which may cause a processing failure, such as fracture of the first and third fastening portions 112 and 132.

The first and second end plates 110 and 120 and the support plate 130 may be coated with an insulator. The first and second end plates 110 and 120 and the support plate 130 may be made of, for example, a metal having a high strength so that the battery cells 10 are fixed (e.g., firmly fixed) to each other. In this case, the first and second end plates 110 and 120 and the support plate 130 are coated with the insulator so as to be insulated from the battery cells 10 and to prevent corrosion of the battery cells 10, the first and second end plates 110 and 120, and the support plate 130.

For example, the insulator may include a heat-dried coating (e.g., paint). More specifically, the insulator may include polyamide-imide resin or polyester-melamine resin. Because the insulator has high abrasion resistance and adhesion, the insulator will not easily come off and can be maintained even when pressure (e.g., excessive pressure or force) is applied to any of the first, second, third, or fourth fastening portions 112, 122, 132, and 133.

Hereinafter, other embodiments of the present invention will be described with reference to FIGS. 4A to 6. Characteristics of these embodiments, except the following characteristics, are similar to those of the embodiment described with reference to FIGS. 1 to 3C, and therefore, their detailed descriptions will be omitted.

Figure 4A:
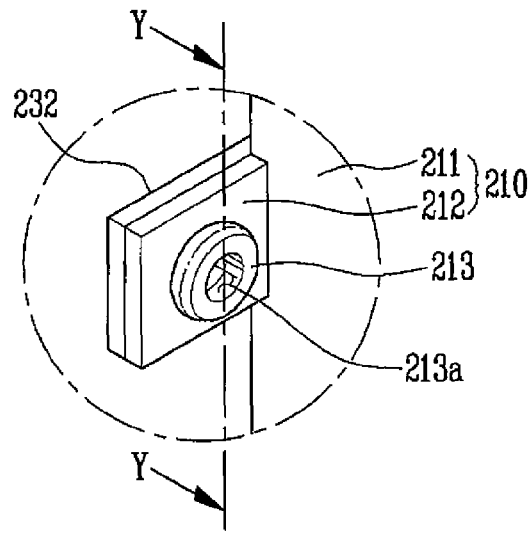
FIG. 4A is a perspective view showing first and third fastening portions in a battery module according to another embodiment of the present invention.
Figure 4B:
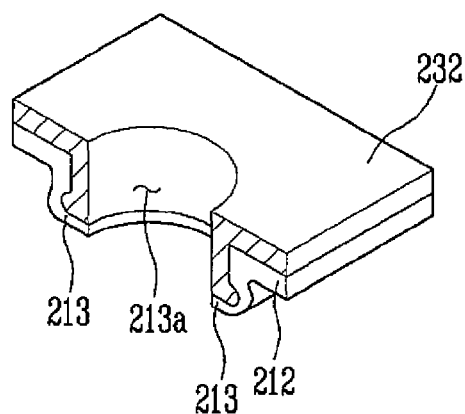
FIG. 4B is a perspective view taken along the line Y-Y of FIG. 4A.
Figure 4C:
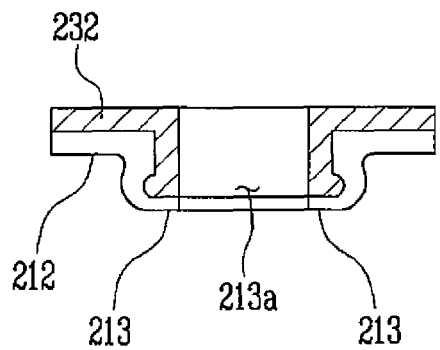
FIG. 4C is a sectional view taken along the line Y-Y of FIG. 4A.

FIG. 4A is a perspective view showing first and third fastening portions in a battery module according to another embodiment of the present invention. FIG. 4B is a perspective view taken along the line Y-Y of FIG. 4A. FIG. 4C is a sectional view taken along the line Y-Y of FIG. 4A.

Referring to FIGS. 4A to 4C, a first end plate 210 may include a first base portion 211 and a first fastening portion 212 extending from an edge (e.g., corner) of and perpendicular to the first base portion 211 (e.g., bent in the first direction). In this case, the first fastening portion 212 is coupled (e.g., fastened) to a third fastening portion 232 of a support plate. The first fastening portion 212 may have a prominence 213.

The prominence 213 includes a through-hole 213a therein, and the through-hole 213a may pass through (e.g., be formed to extend through) the first and third fastening portions 212 and 232. The first and third fastening portions 212 and 232 may be coupled (e.g., fastened) to each other so that the prominence 213 protrudes inwards (e.g., towards the battery cells 10 or in a direction from the outside of the third fastening portion 232 towards the first fastening portion 212). That is, in the battery module having a new fastening method according to this embodiment, the through-hole 213a is formed in (e.g., provided in) the prominence 213, and thus it may be easier to cope with a change in design of the battery module. Further, a melted resin may be inserted into the through-hole 213a so that the exterior appearance of the battery module is pleasing and to cover a sharp edge of the battery module.

Figure 5:
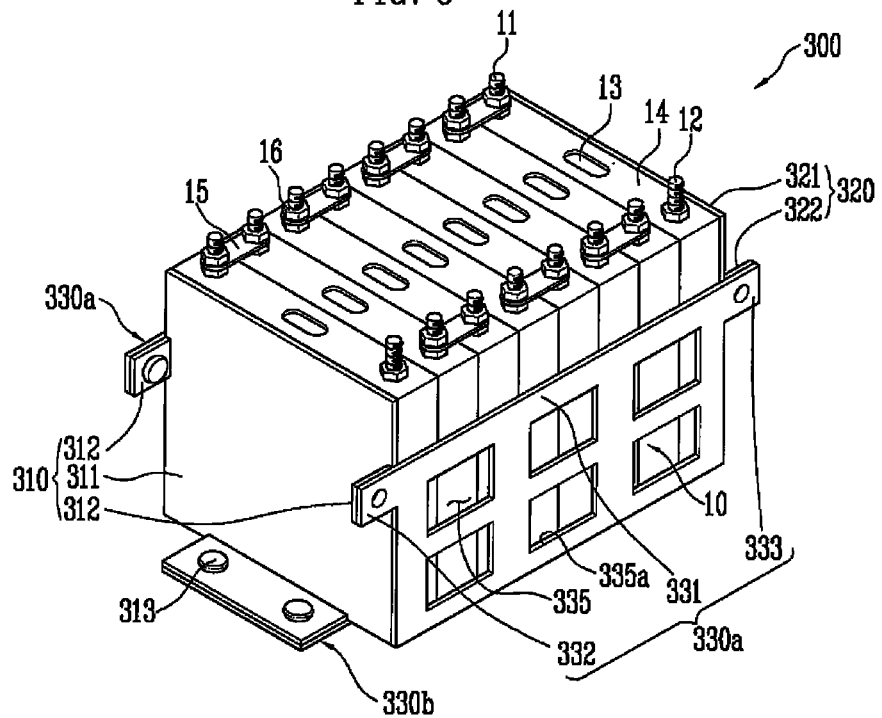
FIG. 5 is a perspective view of a battery module according to still another embodiment of the present invention.
Figure 6:
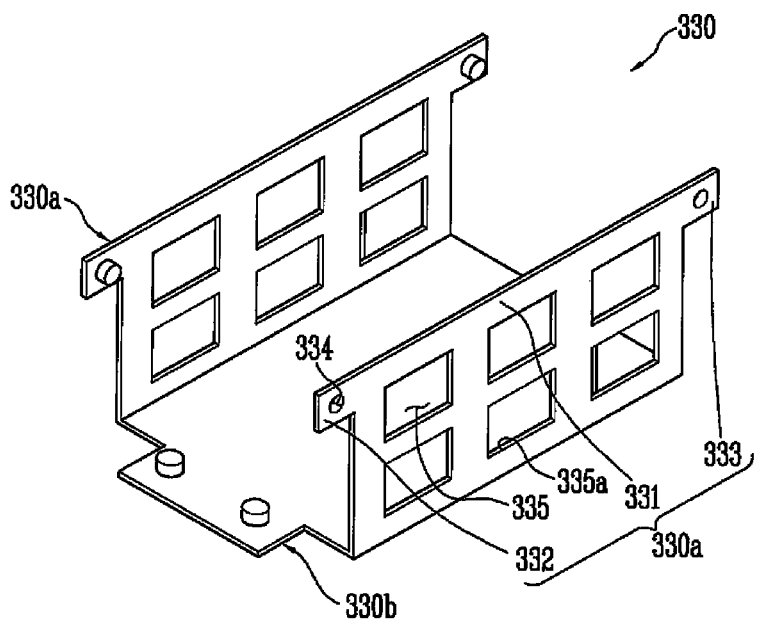
FIG. 6 is a perspective view of a support plate of FIG. 5.

FIG. 5 is a perspective view of a battery module according to still another embodiment of the present invention. FIG. 6 is a perspective view of a support plate of FIG. 5.

Referring to FIGS. 5 and 6, the battery module 300 according to this embodiment may include a support plate 330 including a pair of first plates 330a adjacent to (e.g., supporting) both side surfaces (e.g., short side surfaces) of the battery cells 10, respectively, and a second plate 330b adjacent to (e.g., supporting) bottom surfaces of the battery cells 10 (e.g., a bottom surface of the battery module 300). In this case, the pair of first plates 330a may be formed with (e.g., integrally formed with) the second plate 330b, such as by being coupled to (e.g., vertically connected to) the second plate 330b.

The first and/or second plates 330a and/or 330b may include a main support portion 331 adjacent to (e.g., contacting) the battery cells 10 and including third and fourth fastening portions 332 and 333 extending parallel (e.g., along the first direction) at both ends of the main support portion 331, respectively. First and second fastening portions 312 and 322 extend perpendicularly from (e.g., are provided at) each edge (e.g., both side surfaces) of first and second base portions 311 and 321, respectively, and correspond to the third and fourth fastening portions 332 and 333, respectively. Thus, the first and second fastening portions 312 and 322 can be coupled (e.g., fastened) to the third and fourth fastening portions 332 and 333, respectively. In the battery module 300, the first and second end plates 310 and 320 may be coupled (e.g., fastened) to the support plate 330 by applying a force or pressure (e.g., mechanical force or pressure) at the outer surface (e.g., the surface opposite the surface adjacent to the battery cells 10) of the support plate 330 at an area corresponding to the first and second end plates 310 and 320, respectively. In this case, a concave portion 334 may be formed in (e.g., provided to) each of the third and fourth fastening portions 332 and 333, and prominences 313 and 323 may be formed in (e.g., provided to) the first and second fastening portions 312 and 322, respectively.

One or more openings 335 may be formed in (e.g., provided in) the support plate 330, for instance, in the first plate 330a. The opening 335 is configured to allow heat exchange between the battery cells 10 and outside the battery module 300 (e.g., the opening 335 acts as a passage of a heat exchange medium for performing a heat exchange with the battery cells 10), thereby efficiently cooling the battery cells 10. The opening 335 may form a plurality of edges 335a (e.g., cutting edges) in the support plate 330. The support plate 330 according to this embodiment is coated with (e.g., by), for example, an insulator having high abrasion resistance and adhesion, such as polyamide-imide resin or polyester-melamine resin.

Thus, when the edge 335a is formed in the support plate 330, the coating of the insulator does not easily come off and is maintained. Accordingly, it is possible to reduce (e.g., prevent) corrosion of the battery module 300 and the support plate 330, thereby increasing the lifespan of the battery module.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
   a plurality of battery cells arranged along a first direction;
   first and second end plates, the first and second end plates being located along the first direction at opposite ends of the plurality of battery cells; and
   at least one support plate coupling the first and second end plates to each other,
      the first end plate comprising at least one first fastening portion,
      the second end plate comprising at least one second fastening portion,
      the support plate comprising a main support portion, a third fastening portion at one end of the main support portion, and a fourth fastening portion at an opposite end of the main support portion, the main support portion being adjacent to a side surface of the plurality of battery cells and between the first and second end plates, and each of the third and fourth fastening portions comprising a concave portion recessed inward,
      the first and second fastening portions being coupled at an inner surface of the third and fourth fastening portions, respectively, each of the first and second fastening portions comprising a prominence protruding inward and corresponding to the concave portions, and
      a through-hole extending through the first and third fastening portions and/or the second and fourth fastening portions.

2. The battery module of claim 1, wherein the first end plate further comprises a first base portion, and the second end plate further comprises a second base portion, the first and second base portions being adjacent to the opposite ends of the plurality of battery cells, and the first and second fastening portions extend from edges of and are substantially perpendicular to the first and second base portions, respectively.

3. The battery module of claim 1, wherein the support plate further comprises a pair of first plates adjacent to opposite side surfaces of the plurality of battery cells, and a second plate adjacent to a bottom surface of the plurality of battery cells.

4. The battery module of claim 3, wherein the pair of first plates are integrally formed at and extend substantially perpendicularly from the second plate.

5. The battery module of claim 1, wherein the first and second end plates and the support plate are coated with an insulator.

6. The battery module of claim 5, wherein the insulator comprises a heat-dried coating.

7. The battery module of claim 5, wherein the insulator comprises a polyamide-imide resin or polyester-melamine resin.

8. The battery module of claim 1, wherein a thickness of each of the prominences is less than a thickness of an area surrounding the respective prominence.

9. The battery module of claim 1, wherein a height of each of the prominences is in a range of about 1 mm to about 3 mm.

10. The battery module of claim 1, wherein a cross-section in a plane parallel to the first fastening portion of each of the prominences has a circular or polygonal shape.

11. The battery module of claim 10, wherein the cross-section of each of the prominences has a circular shape having an outside diameter in a range of about 3 mm to about 12 mm.

12. The battery module of claim 1, wherein the first and third fastening portions and the second and fourth fastening portions are each coupled through a clinching process.

* * * * *